United States Patent
Bell (10) Patent No.: US 10,480,577 B2
(45) Date of Patent: Nov. 19, 2019

(54) ASYMMETRICAL RADIAL BEARING

(71) Applicant: Halliburton Energy Services, Inc., Houston, TX (US)

(72) Inventor: Steven Graham Bell, Red Deer (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/776,870

(22) PCT Filed: Dec. 21, 2016

(86) PCT No.: PCT/CA2016/051520
§ 371 (c)(1),
(2) Date: May 17, 2018

(87) PCT Pub. No.: WO2017/117651
PCT Pub. Date: Jul. 13, 2017

(65) Prior Publication Data
US 2018/0335084 A1    Nov. 22, 2018

Related U.S. Application Data (60) Provisional application No. 62/275,578, filed on Jan. 6, 2016.

(51) Int. Cl.
F16C 33/26    (2006.01)
F16C 17/02    (2006.01)
F16C 33/04    (2006.01)

(52) U.S. Cl.
CPC .............. *F16C 33/26* (2013.01); *F16C 17/02* (2013.01); *F16C 33/043* (2013.01);
(Continued)

(58) Field of Classification Search
CPC ...... F16C 33/26; F16C 33/043; F16C 2352/00
See application file for complete search history.

(56) References Cited

U.S. PATENT DOCUMENTS 4,190,302 A    2/1980   Lynn et al.
4,641,976 A *  2/1987   Kar .......................... C22C 9/00
                                                         175/371
(Continued)

FOREIGN PATENT DOCUMENTS

GB    2097486    11/1982

*Primary Examiner* — Thomas R Hannon
(74) *Attorney, Agent, or Firm* — Terrence N. Kuharchuk; Parlee McLaws LLP; Craig W. Roddy (57) ABSTRACT

A radial bearing for transmitting a radial load, including a first radial bearing component defining a first radial bearing surface and an orientable second radial bearing component defining a second radial bearing surface. At least a portion of the first radial bearing surface is provided by a first radial bearing material. A portion of the second radial bearing surface is provided by a second radial bearing material. The first radial bearing component and the second radial bearing component interact to transmit the radial load between the first radial bearing component and the second radial bearing component at a radial load location on the second radial bearing component. The second radial bearing material is provided as the portion of the second radial bearing surface such that the second radial bearing material is concentrated at the radial load location.

19 Claims, 3 Drawing Sheets

(52) U.S. Cl.
CPC ...... *F16C 2206/04* (2013.01); *F16C 2240/40* (2013.01); *F16C 2352/00* (2013.01)

(56) References Cited

U.S. PATENT DOCUMENTS

| | | | | |
|---|---|---|---|---|
| 4,764,036 A | * | 8/1988 | McPherson | E21B 4/003 |
| | | | | 175/320 |
| 4,842,424 A | | 6/1989 | Narkon et al. | |
| 5,372,430 A | * | 12/1994 | Orndorff, Jr. | B63H 23/326 |
| | | | | 384/116 |

* cited by examiner

ASYMMETRICAL RADIAL BEARING

TECHNICAL FIELD

A radial bearing for transmitting a radial load exerted at a radial load location on an orientable component of the radial bearing.

BACKGROUND OF THE INVENTION

In the oil and gas industry holes may be drilled in subterranean formations using rotating equipment. Bearings may be used to support rotating components axially and/or radially. Examples of bearings include radial bearings for resisting radial loads and thrust bearings for supporting axial loads. Bearings may be provided in various bearing configurations in rotating equipment for at least partially supporting radial and/or axial loads.

BRIEF DESCRIPTION OF DRAWINGS

Embodiments of the invention will now be described with reference to the accompanying drawings, in which.

DETAILED DESCRIPTION

This description is directed, in part, to a radial bearing for transmitting a radial load between a first radial bearing component and a second radial bearing component of the radial bearing. The radial bearing described herein may be particularly suited for transmitting a radial load which is not evenly distributed on the second radial bearing component, but is limited to or concentrated at a radial load location on the second radial bearing component. In such circumstances, the first radial bearing component and the second radial bearing component may interact in order to transmit the radial load between the first radial bearing component and the second radial bearing component exclusively or primarily at the radial load location on the second radial bearing component.

As used herein, radial load location may mean a localized circumferential and/or axial point, area or region on the second radial bearing component, resulting from the configuration of the radial bearing and/or of an apparatus in which the radial bearing is used, at which a particular radial load is exerted on the second radial bearing component during use of the apparatus, so that the particular radial load is not exerted evenly on the second radial bearing component, but is exerted on the second radial bearing component exclusively or primarily at the radial load location.

The radial bearing described herein may be used in any environment and/or in any apparatus in which a radial bearing is required. The radial bearing described herein may be particularly suited for use in environments in which a radial load is exerted at a radial load location.

As a non-limiting example, the radial bearing described herein may be a component of an apparatus which is adapted to be inserted in a borehole. The apparatus may be any apparatus which is suitable to be inserted within a borehole. As a non-limiting example, the apparatus may be a drilling apparatus for use in drilling a borehole. As non-limiting examples, such a drilling apparatus may comprise, consist of, or consist essentially of a drilling motor, a rotary steerable drilling apparatus, a turbine, a reciprocating hammer, or any other apparatus which is suitable for use in drilling a borehole.

In such apparatus, the radial load location may result at least in part from the configuration of the apparatus or drilling apparatus. As a non-limiting example, the radial load location may result from a bend in a drilling motor or from a bend in a rotary steerable drilling apparatus, which in turn may result in radial loads being exerted on the second radial bearing component at the radial load location when the apparatus is positioned within a borehole.

The radial bearing comprises the first radial bearing component and the second radial bearing component.

The first radial bearing component defines a first radial bearing surface. The second radial bearing component defines a second radial bearing surface. The radial bearing is configured so that the first radial bearing surface and the second radial bearing surface are adjacent to each other when the radial bearing is assembled.

The first radial bearing surface has a circumference and a length. Similarly, the second radial bearing surface has a circumference and a length. The first radial bearing component and the second radial bearing component are configured to rotate relative to each other and to interact to transmit radial loads between the first radial bearing component and the second radial bearing component via the first radial bearing surface and the second radial bearing surface.

All or a portion of the first radial bearing surface is provided by a first radial bearing material. A portion of the second radial bearing surface is provided by a second radial bearing material.

The first radial bearing material and the second radial bearing material may comprise, consist of, or consist essentially of the same material or combination of materials, or may comprise, consist of, or consist essentially of different materials or combinations of materials.

The first radial bearing material and the second radial bearing material may comprise, consist of, or consist essentially of any material or combination of materials which is suitable for use in a radial bearing, and may be provided as the bearing surfaces in any suitable manner. As a non-limiting example, one or both of the first radial bearing material and the second radial bearing material may comprise, consist of, or consist essentially of one or more wear resistant materials. As non-limiting examples, suitable bearing materials may include polycrystalline diamond compact (PDC) materials, diamond impregnated materials, tungsten carbide materials, wear resistant steel materials, and/or wear resistant coatings or deposits. As non-limiting examples, suitable bearing materials may be provided as inserts, tiles, coatings or deposits in or on the bearing components, or all or a portion of the bearing components may be formed from the bearing materials so that the bearing components provide the bearing materials. Inserts and tiles may be affixed to the bearing components in any suitable manner, including as non-limiting examples, by thermal fit, interference fit, welding, brazing, soldering, adhesive etc. Coatings and deposits may be applied to the bearing components in any suitable manner, including as non-limiting examples, by a thermal application such as laser cladding, or by spraying, sputtering, vapour deposition, etc.

The second radial bearing material is provided as a portion of the second radial bearing surface so that the second radial bearing material is concentrated at the radial load location.

As used herein, concentrated at the radial load location may mean that a relatively greater area of second radial bearing material and/or a relatively greater area density (i.e., smaller spacing between inserts, etc.) of second radial bearing material is provided as the second radial bearing surface at or adjacent to the radial load location on the second radial bearing component than elsewhere on the second radial bearing surface, so that the bearing capacity of the second radial bearing surface is increased at or adjacent to the radial load location relative to other locations on the second radial bearing surface.

The extent of the area of concentration of the second radial bearing material at the radial load location may vary depending upon various factors, including as non-limiting examples, the magnitude of the radial load, the configuration of the apparatus, the configuration of the radial bearing, the size of the radial bearing, the variability of the radial load during use, the materials from which the radial bearing components are constructed, etc.

The second radial bearing material may be concentrated at the radial load location along a portion of the circumference of the second radial bearing surface, and/or may be concentrated at the radial load location along a portion of the length of the second radial bearing surface. Alternatively or additionally, the second radial bearing material may be concentrated at the radial load location by increasing the area density of the second radial bearing material on a portion of the circumference and/or the length of the second radial bearing surface.

The second radial bearing component is orientable relative to the radial load so that the second radial bearing material can be concentrated at the radial load location.

The second radial bearing component may be orientable relative to the radial load by being fixed relative to a frame of reference such as a component of the apparatus in which the radial bearing is used if the radial load is fixed relative to the frame of reference. The second radial bearing component may be orientable relative to the radial load by being rotatable relative to a frame of reference such as a component of the apparatus in which the radial bearing is used if the radial load is rotatable relative to the frame of reference. As non-limiting examples, the second radial bearing component may be fixed or rotatable relative to a housing or a shaft of an apparatus in which the radial bearing is used so that the second radial bearing component is orientable relative to the radial load.

In addition to the first radial bearing material which is provided as all or a portion of the first radial bearing surface, one or more support rings of a support first radial bearing material extending substantially around the entire circumference of the first radial bearing surface may optionally be provided as a portion of the first radial bearing surface. The one or more support rings of the support first radial bearing material are separate from and may be axially spaced from the first radial bearing material.

The support first radial bearing material may comprise, consist of, or consist essentially of any material or combination of materials which is suitable for use in a radial bearing, and may be provided as a portion of the first radial bearing surface in any suitable manner. The support first radial bearing material may comprise, consist of, or consist essentially of the same material or combination of materials as the first radial bearing material and/or the second radial bearing material, or may comprise, consist of, or consist essentially of a different material or combination of materials than the first radial bearing material and/or the second radial bearing material.

In addition to the second radial bearing material which is provided as a portion of the second radial bearing surface and concentrated at the radial load location, one or more support rings of a support second radial bearing material extending substantially around the entire circumference of the second radial bearing surface may optionally be provided as a portion of the second radial bearing surface. The one or more support rings of the support second radial bearing material are separate from and may be axially spaced from the second radial bearing material.

The support second radial bearing material may comprise, consist of, or consist essentially of any material or combination of materials which is suitable for use in a radial bearing, and may be provided as a portion of the second radial bearing surface in any suitable manner. The support second radial bearing material may comprise, consist of, or consist essentially of the same material or combination of materials as the first radial bearing material, the second radial bearing material, and/or the support first radial bearing material, or may comprise, consist of, or consist essentially of a different material or combination of materials than the first radial bearing material, the second radial bearing material, and/or the support first radial bearing material.

Since the second radial bearing component is orientable relative to the radial load, and since the first radial bearing component rotates relative to the second radial bearing component, the entire circumference of the first radial bearing component may be exposed to the radial load which is exerted at the radial load location. As a result, the first radial bearing material on the first radial bearing component may extend substantially around the entire circumference of the first radial bearing surface and/or may be distributed around the entire circumference of the first radial bearing surface.

The first radial bearing component and the second radial bearing component may be configured so that the first radial bearing component is received within the second radial bearing component, or may be configured so that the second radial bearing component is received within the first radial bearing component.

FIGS. 1-7 are exemplary only. The radial bearing described herein may be used in any suitable apparatus.

In the description of the exemplary embodiments which follows, features which are identical or equivalent in the exemplary embodiments may be identified with the same reference numbers.

Figure 6:
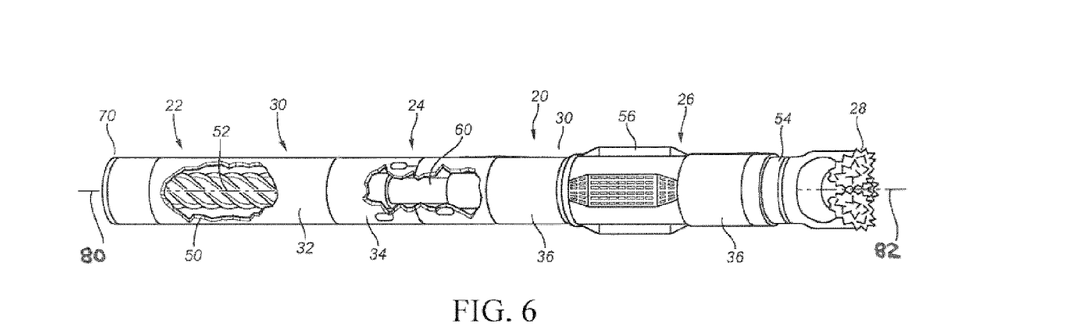
FIG. 6 is a pictorial view of a drilling motor for use in drilling a borehole.

Referring to FIG. 6, an exemplary drilling motor (20) comprises a power section (22) and a bearing section (26). The bearing section (26) is axially distal to the power section (22). One or more sections of the drilling motor (20) may be axially interposed between the power section (22) and the bearing section (26). As depicted in FIG. 6, the drilling motor (20) further comprises a transmission section (24) which is axially interposed between the power section (22) and the bearing section (26). These sections of the drilling motor (20) constitute components of a powertrain which utilizes fluid energy to rotate a drill bit (28). A drill string (70) is connected with the proximal end of the power section (22).

The sections of the drilling motor (20) are contained within a tubular housing (30).

As depicted in FIG. 6, the housing (30) comprises a plurality of housing sections connected together with threaded connections, including a tubular power housing (32) for the power section (22), a tubular transmission housing (34) for the transmission section (24), and a tubular bearing housing (36) for the bearing section (26).

The power housing (32) may comprise a plurality of power housing components which together provide the power housing (32), or the power housing (32) may be a unitary power housing (32) which is formed from a single drive housing component.

The transmission housing (34) may comprise a plurality of transmission housing components which together provide the transmission housing (34), or the transmission housing (34) may be a unitary transmission housing (34) which is formed from a single transmission housing component.

The bearing housing (36) may comprise a plurality of bearing housing components which together provide the bearing housing (36), or the bearing housing (36) may be a unitary bearing housing (36) which is formed from a single bearing housing component.

The power section (22) of the drilling motor (20) comprises a stator (50) and a drive member or rotor (52). The stator (50) is fixedly connected with the power housing (32), and the rotor (52) is rotatable within the stator (50) in response to fluid circulating through the power section (22).

As depicted in FIG. 6, the power section (22) is a Moineau-type power section in which the stator (50) and the rotor (52) are lobed. The rotor (52) has one fewer lobe than the stator (50), and rotates eccentrically within the stator (50).

The transmission section (24) accommodates and converts the eccentric movement of the rotor (52) to concentric rotation of a driveshaft (54) within the bearing section (26). The transmission section (24) also transmits rotational drive energy from the power section (22) to the bearing section (26).

As depicted in FIG. 6, the transmission section (24) comprises the transmission housing (34) and a transmission member or transmission shaft (60) which is connected between the rotor (52) and the driveshaft (54) such that eccentric rotation of the rotor (52) results in concentric rotation of the transmission shaft (60), and rotation of the transmission shaft (60) causes rotation of the driveshaft (54).

As depicted in FIG. 6, the bearing section (26) comprises the bearing housing (36), the driveshaft (54) and a bearing assembly (not shown in FIG. 6) comprising one or more thrust bearings and radial bearings which rotatably support the driveshaft (54) within the housing (30). As depicted in FIG. 6, the bearing section (26) also comprises a stabilizer (56) which is threadably connected with the exterior of the bearing housing (36).

As depicted in FIG. 6, the drill bit (28) is connected with the driveshaft (54) so that rotation of the driveshaft (54) causes rotation of the drill bit (28).

The drilling motor (20) has a primary axis (80) and the driveshaft (54) has a driveshaft axis (82). As depicted in FIG. 6, the driveshaft axis (82) is oblique to the primary axis (80) so that there is a "bend" in the drilling motor (20). The bend in the drilling motor (20) may be provided by a bend in the exterior of the housing (30), by a bend in the interior of the housing (30), by an articulation of the driveshaft (54) within the housing (30), or in any other suitable manner.

Figure 7:
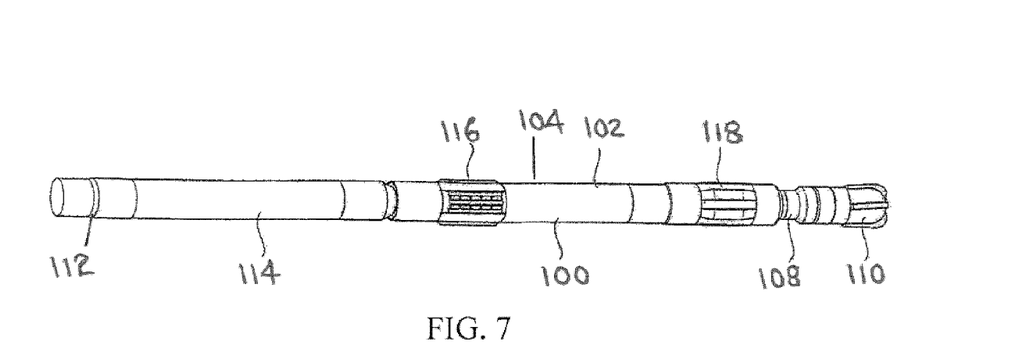
FIG. 7 is a pictorial view of a rotary steerable drilling apparatus for use in drilling a borehole.

Referring to FIG. 7, an exemplary rotary steerable drilling apparatus (100) comprises a housing (102) having an exterior surface (104). A shaft (108) extends through the housing (102). The shaft (108) is rotatable relative to the housing (102).

In the exemplary rotary steerable apparatus (100), a drill bit (110) is connected with a distal end of the shaft (108), and a drill string (112) is connected with a proximal end of the shaft (108). The drill string (112) may include a drill string communication system (114) such as a measurement-while-drilling system.

In the exemplary rotary steerable drilling apparatus (100), an anti-rotation device (116) is connected with or integrated into the housing (102) adjacent to a proximal end of the housing (102), and a near-bit stabilizer (118) is connected with or integrated into the housing (102) adjacent to a distal end of the housing (102).

In the exemplary rotary steerable drilling apparatus (100), a deflection mechanism (not shown) is contained within the housing (102), which may be actuated to cause radial deflection of a portion of the shaft (108) within the housing (102).

The deflection mechanism may be comprised of any structure, device or apparatus which is capable of causing the radial deflection of the portion of the shaft (108) within the housing (102). The radial deflection of the portion of the shaft (108) may result in bending of the shaft (108) within the housing (102). Additionally or alternatively, the radial deflection of the portion of the shaft (108) may result in articulation of the shaft (108) within the housing (102), if the shaft (108) is comprised of a joint (not shown) which facilitates such articulation.

In the exemplary embodiment of the rotary steerable drilling apparatus (100), a bearing assembly (not shown in FIG. 7) is contained within the housing (102), comprising one or more thrust bearings and radial bearings which rotatably support the shaft (108) within the housing (102).

Figure 1:
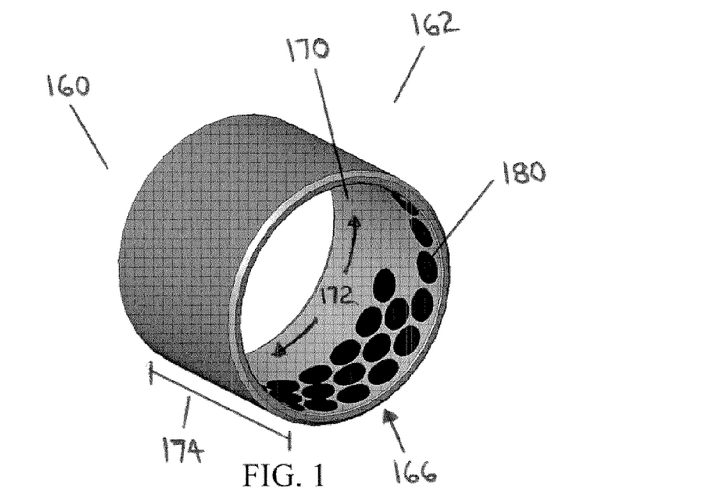
FIG. 1 is a first pictorial view of a first exemplary embodiment of a second radial bearing component, wherein a second radial bearing material is concentrated at a radial load location on the second thrust bearing component.
Figure 2:
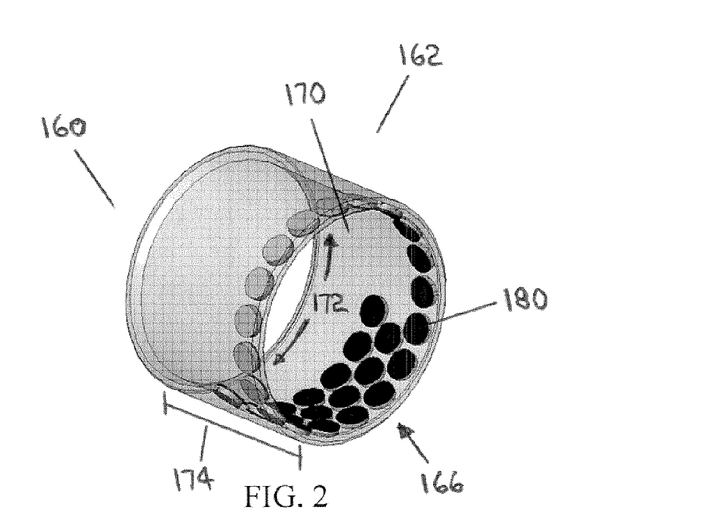
FIG. 2 is a second pictorial view of the second radial bearing component of FIG. 1, wherein the second radial bearing component is depicted as transparent in order to more fully depict the second radial bearing material.
Figure 3:
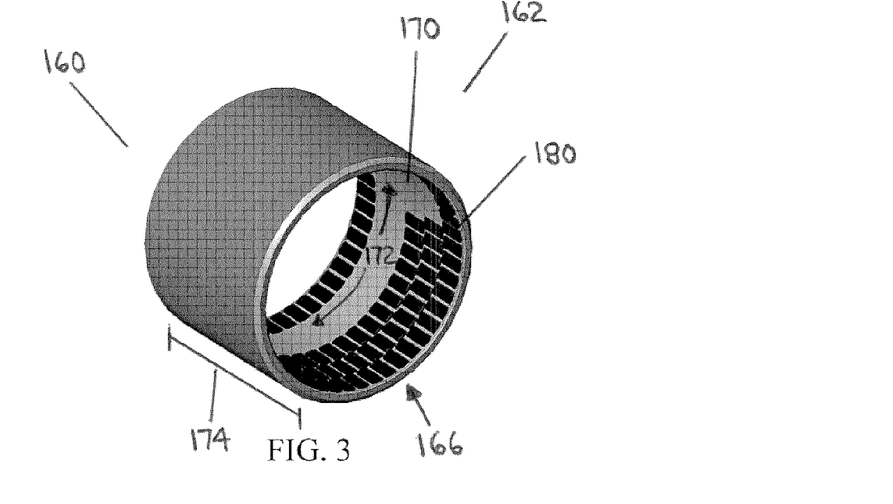
FIG. 3 is a first pictorial view of a second exemplary embodiment of a second radial bearing component, wherein a second radial bearing material is concentrated at a radial load location on the second thrust bearing component, further comprising a support ring of a support second radial bearing material, wherein the support ring is axially spaced from the second radial bearing material.
Figure 4:
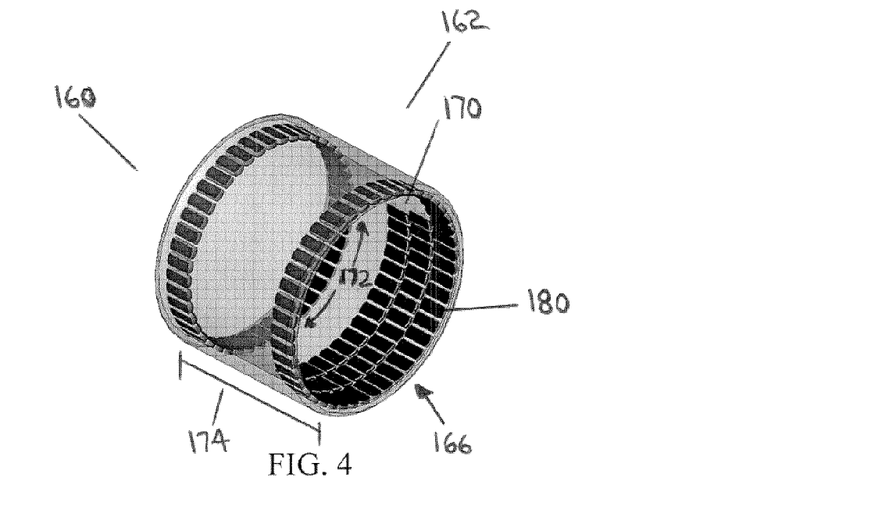
FIG. 4 is a second pictorial view of the second radial bearing component of FIG. 3, wherein a second radial bearing component is depicted as transparent in order to more fully depict the second radial bearing material and the support second radial bearing material.
Figure 5:
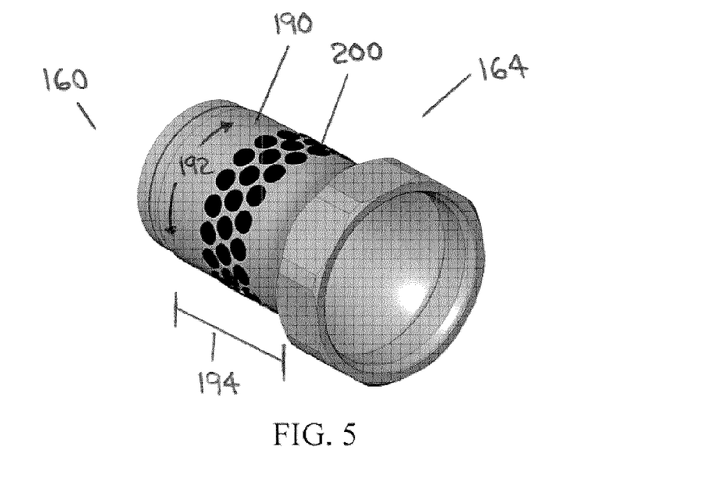
FIG. 5 is a pictorial view of an embodiment of a first radial bearing component, wherein a first radial bearing material extends substantially around the entire circumference of the first radial bearing surface.

FIGS. 1-2 depict a first exemplary embodiment of a second radial bearing component (162). FIGS. 3-4 depict a second exemplary embodiment of a second radial bearing component (162). FIG. 5 depicts an exemplary embodiment of a first radial bearing component (164).

In the exemplary embodiments, the radial bearing components (162, 164) are configured so that the first radial bearing component (164) is received within the second radial bearing component (162). In other embodiments, the radial bearing components (162, 164) may be configured so that the second radial bearing component (162) is received within the first radial bearing component (164).

In the exemplary embodiments, the second radial bearing component (162) is orientable within the apparatus within which the radial bearing (160) is used.

In the exemplary embodiments, the second radial bearing component (162) is orientable relative to a particular radial load which is exerted on the second radial bearing component (162) during use of the apparatus, resulting from the configuration of the radial bearing (160) and/or of the apparatus, so that the radial load is exerted on the second radial bearing component (162) at a radial load location (166) on the second radial bearing component (162).

In the exemplary embodiments, the second radial bearing component (162) is orientable relative to the radial load by being fixedly connected in a suitable manner with the housing of the apparatus within which the radial bearing (160) is used, such as with the bearing housing (36) of the drilling motor (20) or with the housing (102) of the rotary steerable drilling apparatus (100).

Referring to FIGS. 1-4, the second radial bearing component (162) defines a second radial bearing surface (170). The second radial bearing surface (170) has a circumference (172), a length (174), and an area defined by the circumference (172) and the length (174).

A second radial bearing material is provided as a portion of the second radial bearing surface (170). The second radial bearing material may comprise, consist of, or consist essentially of any suitable material, and may be provided as a portion of the second radial bearing surface (170) in any suitable manner.

In the exemplary embodiments depicted in FIGS. 1-4, the second radial bearing material comprises inserts (180) of a wear resistant material such as a polycrystalline diamond compact (PDC) material, which are mounted in an array on or in the second radial bearing component (162). The inserts (180) may be mounted on or in the second radial bearing component (162) in pockets (not shown) or in any other suitable manner, and may be fixed in position by thermal fit, interference fit, welding, brazing or soldering, with an adhesive, or in any other suitable manner.

In the exemplary embodiments, the inserts (180) are arranged as a portion of the second radial bearing surface (170) so that a larger number of inserts (180) are at or adjacent to the radial load location (166) than elsewhere on the second radial bearing surface (170). As a result, the inserts (180) are concentrated at the radial load location (166) and thus provide a greater area of the second radial bearing material and/or a greater area density of the second radial bearing material at or adjacent to the radial load location (166).

In the exemplary embodiments, the inserts (180) are concentrated along a portion of the circumference (172) of the second radial bearing surface (170) and along a portion of the length (174) of the second radial bearing surface (170).

In the first exemplary embodiment depicted in FIGS. 1-2, the inserts (180) are concentrated along less than about one-half of the circumference (172) and along less than about one-half of the length (174) of the second radial bearing surface (170). In the second exemplary embodiment depicted in FIGS. 3-4, the inserts (180) are concentrated along less than about two-thirds of the circumference (172) and along less than about one-half of the length (174) of the second radial bearing surface (170).

In other embodiments, the second radial bearing material, as inserts (180) or in any other form, may be concentrated along less than or greater than one-half or two-thirds of the circumference (172) of the second radial bearing surface (170) and/or along less than or greater than one-half of the length (174) of the second radial bearing surface (170).

The extent of the area of concentration of the second radial bearing material on the second radial bearing surface (170) and the shape or pattern of the area of concentration may vary according to various factors, including as non-limiting examples, the magnitude of the radial load, the configuration of the apparatus, the configuration of the radial bearing (160), the size of the radial bearing, the variability of the radial load during use of the apparatus, the materials from which the radial bearing components (162, 164) are constructed, etc.

In some embodiments, the extent of the area of concentration of the second radial bearing material and/or the shape or pattern of the concentration area may be designed using modeling methods, techniques and/or software, having regard to the expected environment in which the radial bearing (160) may be used and the loads which are expected to be exerted upon the radial bearing (160).

Referring to FIGS. 1-2, in the first exemplary embodiment of the second radial bearing component (162), the inserts (180) are generally circular. Referring to FIGS. 3-4, in the second exemplary embodiment of the second radial bearing component (162), the inserts (180) are generally rectangular. In the second exemplary embodiment, the generally rectangular inserts (180) may be fabricated as generally rectangular, or generally circular inserts (180) may be cut or otherwise modified to produce generally rectangular inserts (180).

An advantage of generally rectangular inserts (180) over generally circular inserts (180) is that the generally rectangular inserts (180) may potentially be arranged closer together or more "densely" on the second radial bearing surface (170) than generally circular inserts (180), thereby enabling a greater area and/or a greater area density of the second radial bearing material within the area of concentration of the second radial bearing material.

Referring again to FIGS. 3-4, in the second exemplary embodiment, a ring of a support second radial bearing material, which is separate from and axially spaced from the concentrated second radial bearing material, extends substantially around the entire circumference of the second radial bearing surface (170) as a support ring (182).

In other embodiments, no support ring (182) may be provided (as in the first exemplary embodiment) or more than one support ring (182) may be provided. One or more support rings (182) may be advantageous for supporting the first radial bearing component (164) and/or for providing a general radial load bearing capacity for radial loads other than the radial load which is exerted at the radial load location.

Referring to FIG. 5, the first radial bearing component (164) defines a first radial bearing surface (190). The first radial bearing surface (190) has a circumference (192), a length (194), and an area defined by the circumference (192) and the length (194).

In the exemplary embodiment of the first radial bearing component (164), a first radial bearing material is provided as a portion of the first radial bearing surface (190). The first radial bearing material may comprise, consist of, or consist essentially of any suitable material, which may be provided as a portion of the first radial bearing surface (190) in any suitable manner. In some embodiments, the first radial bearing material may be a non-wear resistant material or a relatively non-wear resistant material if the first radial bearing component is configured as a wear part or a sacrificial component.

In the exemplary embodiment of the first radial bearing component (164), the first radial bearing material comprises inserts (200) of a wear resistant material such as a polycrystalline diamond compact (PDC) material, which are mounted in an array on or in the first radial bearing component (164). The inserts (200) may be mounted on or in the first radial bearing component (164) in pockets (not shown) or in any other suitable manner, and may be fixed in position by thermal fit, interference fit, welding, brazing or soldering, with an adhesive, or in any other suitable manner.

In the exemplary embodiment of the first radial bearing component (164), the inserts (200) are mounted on or in the first radial bearing component (164) in a circumferential array which extends substantially around the entire circumference (192) of the first radial bearing surface (190).

Optionally, one or more rings of a support first radial bearing material, which are separate from and/or axially spaced from the circumferential array of the first radial bearing material, may extend substantially around the entire circumference of the first radial bearing surface (190) as support rings (not shown in FIG. 5).

In the exemplary embodiments of the radial bearing components (162, 164), the second radial bearing material providing the area of concentration on the second radial bearing surface (170) and the first radial bearing material providing the circumferential array on the first radial bearing surface (190) are configured so that the bearing materials coincide and contact each other when the radial bearing (160) is assembled. Similarly, in the exemplary embodiments, the support second radial bearing material providing one or more support rings (182) on the second radial bearing surface (170) and the support first radial bearing material providing one or more support rings (not shown) on the first radial bearing surface (190) are configured and axially positioned so that the bearing materials coincide and contact each other when the radial bearing (160) is assembled.

ADDITIONAL DISCLOSURES

The following are non-limiting, specific embodiments of the radial bearing described herein:

Embodiment A. A radial bearing for transmitting a radial load, comprising:
(a) a first radial bearing component defining a first radial bearing surface, wherein at least a portion of the first radial bearing surface is provided by a first radial bearing material; and
(b) a second radial bearing component defining a second radial bearing surface, wherein a portion of the second radial bearing surface is provided by a second radial bearing material, wherein the first radial bearing component and the second radial bearing component interact to transmit the radial load between the first radial bearing component and the second radial bearing component at a radial load location on the second radial bearing component, wherein the second radial bearing component is orientable relative to the radial load, and wherein the second radial bearing material is provided as the portion of the second radial bearing surface such that the second radial bearing material is concentrated at the radial load location.

Embodiment B. The radial bearing of Embodiment A wherein the second radial bearing surface has a circumference and wherein the second radial bearing material is provided along a portion of the circumference of the second radial bearing surface.

Embodiment C. The radial bearing of Embodiment A or B wherein the second radial bearing surface has a length and wherein the second radial bearing material is provided along a portion of the length of the second radial bearing surface.

Embodiment D. The radial bearing any one of Embodiments A through C wherein the second radial bearing material is provided along less than one-half of the circumference of the second radial bearing surface.

Embodiment E. The radial bearing of any one of Embodiments A through D wherein the second radial bearing material is a wear resistant material.

Embodiment F. The radial bearing of any one of Embodiments A through E wherein the second radial bearing material comprises one or more inserts mounted in the second radial bearing component.

Embodiment G. The radial bearing of any one of Embodiments A through F wherein the second radial bearing material comprises a coating on the second radial bearing component.

Embodiment H. The radial bearing of any one of Embodiments A through G wherein a portion of the second radial bearing component is formed from the second radial bearing material so that the second radial bearing component provides the second radial bearing material.

Embodiment I. The radial bearing of any one of Embodiments A through H wherein the second radial bearing material comprises a plurality of inserts mounted in the second radial bearing component, wherein the plurality of inserts has an area density, and wherein the area density of the inserts is concentrated at the radial load location.

Embodiment J. The radial bearing of any one of Embodiments A through I wherein the first radial bearing surface has a circumference and wherein the first radial bearing material extends substantially around the entire circumference of the first radial bearing surface.

Embodiment K. The radial bearing of any one of Embodiments A through J wherein the first radial bearing material is a wear resistant material.

Embodiment L. The radial bearing of any one of Embodiments A through K wherein the first radial bearing material comprises one or more inserts mounted in the first radial bearing component.

Embodiment M. The radial bearing of any one of Embodiments A through L wherein the first radial bearing material comprises a coating on the first radial bearing component.

Embodiment N. The radial bearing of any one of Embodiments A through M wherein at least a portion of the first radial bearing component is formed from the first radial bearing material so that the first radial bearing component provides the first radial bearing material.

Embodiment O. The radial bearing of any one of Embodiments A through N wherein the radial bearing is a component of an apparatus which is adapted to be inserted in a borehole.

Embodiment P. The radial bearing of any one of Embodiments A through O wherein the radial bearing is a component of a drilling apparatus for use in drilling a borehole.

Embodiment Q. The radial bearing of any one of Embodiments A through P wherein the radial bearing is a component of a drilling apparatus for use in drilling a borehole and wherein the radial load location is defined by the configuration of the drilling apparatus.

Embodiment R. The radial bearing of any one of Embodiments A through Q wherein the drilling apparatus is a drilling motor and wherein the radial load location is defined by a bend in the drilling motor.

Embodiment S. The radial bearing of any one of Embodiments A through Q wherein the drilling apparatus is a rotary steerable drilling apparatus and wherein the radial load location is defined by a bend in the rotary steerable drilling apparatus.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

I claim:

1. A drilling apparatus for use in drilling a borehole, wherein the drilling apparatus has a primary axis, the drilling apparatus comprising:
    a housing;
    a shaft within the housing, wherein the shaft is rotatable relative to the housing, wherein the shaft has a shaft axis, and wherein the shaft axis is oblique to the primary axis so that the drilling apparatus has a bend;
    a bearing assembly for rotatably supporting the shaft within the housing, wherein the bearing assembly comprises one or more thrust bearings and radial bearings, and wherein at least one radial bearing comprises:
        a first radial bearing component defining a first radial bearing surface, wherein at least a portion of the first radial bearing surface is provided by a first radial bearing material; and
        a second radial bearing component fixedly connected with the housing and defining a second radial bearing surface, wherein a portion of the second radial bearing surface is provided by a second radial bearing material, wherein the second radial bearing material is a wear resistant material, wherein the first radial bearing component and the second radial bearing component interact to transmit the radial load between the first radial bearing component and the second radial bearing component at a radial load location on the second radial bearing component, wherein the second radial bearing material is provided as the portion of the second radial bearing surface such that the second radial bearing material is concentrated at the radial load location, and wherein the radial load location is defined by the bend in the drilling apparatus.

2. The drilling apparatus as claimed in claim 1 wherein the second radial bearing surface has a circumference and wherein the second radial bearing material is provided along a portion of the circumference of the second radial bearing surface.

3. The drilling apparatus as claimed in claim 2 wherein the second radial bearing surface has a length and wherein the second radial bearing material is provided along a portion of the length of the second radial bearing surface.

4. The drilling apparatus as claimed in claim 1 wherein the second radial bearing surface has a length and wherein the second radial bearing material is provided along a portion of the length of the second radial bearing surface.

5. The drilling apparatus as claimed in claim 2 wherein the second radial bearing material is provided along less than one-half of the circumference of the second radial bearing surface.

6. The drilling apparatus as claimed in claim 1 wherein the second radial bearing material comprises one or more inserts mounted in the second radial bearing component.

7. The drilling apparatus as claimed in claim 1 wherein the second radial bearing material comprises a coating on the second radial bearing component.

8. The drilling apparatus as claimed in claim 1 wherein a portion of the second radial bearing component is formed from the second radial bearing material so that the second radial bearing component provides the second radial bearing material.

9. The drilling apparatus as claimed in claim 1 wherein the second radial bearing material comprises a plurality of inserts mounted in the second radial bearing component, wherein the plurality of inserts has an area density, and wherein the area density of the inserts is concentrated at the radial load location.

10. The drilling apparatus as claimed in claim 1 wherein the drilling apparatus is a drilling motor and wherein the bend in the drilling apparatus is provided by a bend in an exterior of the housing, by a bend in an interior of the housing, or by an articulation of the shaft within the housing.

11. The drilling apparatus as claimed in claim 1 wherein the drilling apparatus is a rotary steerable drilling apparatus, wherein the rotary steerable drilling apparatus comprises a deflection mechanism, and wherein the bend in the drilling apparatus is caused by a radial deflection of the shaft within the housing by the deflection mechanism.

12. The drilling apparatus as claimed in claim 1 wherein the second radial bearing material is selected from the group of wear resistant materials consisting of a polycrystalline diamond compact material, a diamond impregnated material, a tungsten carbide material, a wear resistant steel material, and combinations thereof.

13. The drilling apparatus as claimed in claim 1 wherein the at least one radial bearing further comprises a support ring of a support second radial bearing material, wherein the support ring is provided as a portion of the second radial bearing surface, and wherein the support ring is separate from and axially spaced from the second radial bearing material.

14. The drilling apparatus as claimed in claim 13 wherein the second radial bearing surface has a circumference and wherein the support ring extends around the circumference of the second radial bearing surface.

15. The drilling apparatus as claimed in claim 1 wherein the first radial bearing surface has a circumference and wherein the first radial bearing material extends substantially around the entire circumference of the first radial bearing surface.

16. The drilling apparatus as claimed in claim 15 wherein the first radial bearing material is a wear resistant material.

17. The drilling apparatus as claimed in claim 15 wherein the first radial bearing material comprises one or more inserts mounted in the first radial bearing component.

18. The drilling apparatus as claimed in claim 15 wherein the first radial bearing material comprises a coating on the first radial bearing component.

19. The drilling apparatus as claimed in claim 15 wherein at least a portion of the first radial bearing component is formed from the first radial bearing material so that the first radial bearing component provides the first radial bearing material.

* * * * *